US011120459B2

(12) United States Patent
Vaculin et al.

(10) Patent No.: US 11,120,459 B2
(45) Date of Patent: Sep. 14, 2021

(54) PRODUCT PLACEMENT OPTIMIZATION USING BLIND-SPOT ANALYSIS IN RETAIL ENVIRONMENTS

(71) Applicant: International Business Machines Corporation, Armonk, NY (US)

(72) Inventors: Roman Vaculin, Larchmont, NY (US); Utkarsh Dwivedi, New Delhi (IN); Karan Ahuja, Vasant Kunj (IN); Seema Nagar, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 16/290,285

(22) Filed: Mar. 1, 2019

(65) Prior Publication Data

US 2020/0279283 A1    Sep. 3, 2020

(51) Int. Cl.
*G06Q 30/02*      (2012.01)
*G06F 3/01*       (2006.01)

(52) U.S. Cl.
CPC ......... *G06Q 30/0205* (2013.01); *G06F 3/013* (2013.01); *G06Q 30/0201* (2013.01)

(58) Field of Classification Search
USPC ....................................................... 705/7.34
See application file for complete search history.

(56) References Cited

U.S. PATENT DOCUMENTS 8,885,047 B2    11/2014  Golan et al.
9,076,149 B2     7/2015  Sorensen et al.
9,129,277 B2     9/2015  MacIntosh
9,400,993 B2     7/2016  Edwards
2008/0043013 A1  2/2008  Gruttadauria et al.
(Continued)

OTHER PUBLICATIONS

SangWoo et al. ("Development of Evaluation Metrics for Pedestrian Flow Optimization in a Complex Service Environment Based on Behavior Observation Method," Seoul National University, Journal of the Ergonomics Society of Korea, vol. 29, No. 4, pp. 647-654, Aug. 2010.).*

(Continued)

*Primary Examiner* — Matthew D Henry
(74) *Attorney, Agent, or Firm* — Scully, Scott, Murphy & Presser, P.C.; Vazken A Alexanian

(57) ABSTRACT

A system and method utilizing a mass user gaze fixation behavior with respect to products and product racks (using a camera-based inputs and gaze-tracking algorithms) and a financial profitability of each product/product type; generates gaze-based heat maps for indicating blind spots and eye gaze points at different positions of the racks/shelves and indicating product placement positions on the heat map; and advises product placement in the retail store for optimizing financial profitability by performing an iterative refinement of product placements over a period for the product/similar products. The system translates mass eye gaze of retail store customers into financial profitability via product placement optimization, and iteratively runs a method to optimize product placements, and generate gaze-based heat maps and perform blind spot analysis for avoiding product placements at certain locations and placing products at other locations, e.g., by running a decision module on consumer gaze pattern data.

17 Claims, 8 Drawing Sheets

(56) References Cited

U.S. PATENT DOCUMENTS

| | | | |
|---|---|---|---|
| 2008/0306756 A1* | 12/2008 | Sorensen | G06Q 30/02 |
| | | | 705/27.1 |
| 2013/0166408 A1* | 6/2013 | Edwards | G06Q 30/0603 |
| | | | 705/26.7 |
| 2014/0172553 A1 | 6/2014 | Goulart | |
| 2014/0289009 A1* | 9/2014 | Campbell | G06Q 30/0202 |
| | | | 705/7.31 |
| 2015/0213391 A1 | 7/2015 | Hasan | |
| 2016/0110772 A1* | 4/2016 | Herring | G06K 9/00577 |
| | | | 705/14.66 |
| 2016/0128568 A1* | 5/2016 | Bellamy | A61B 3/0083 |
| | | | 351/209 |
| 2016/0162912 A1 | 6/2016 | Garel et al. | |
| 2016/0321635 A1* | 11/2016 | Gao | G06Q 30/0201 |
| 2016/0379225 A1* | 12/2016 | Rider | G06K 9/00248 |
| | | | 382/116 |

OTHER PUBLICATIONS

Kang et al., "A Study of Drivers' Blind Spot in Used of Eye Tracking", Proceedings of the 16th International Conference on Human Interface and the Management of Information, Information and Knowledge in Applications and Services—vol. 8522, pp. 253-260, Jun. 22-27, 2014, Springer International Publishing, 2014.

Riegelsberger et al., "Eye-Catcher or Blind Spot? The Effect of Photographs of Faces on E-Commerce Sites", Conference Paper, Jan. 2002, Towards the Knowledge Society, pp. 383-398, Part of the IFIP—THe International Federation for Information Processing book series (IFIPAICT, vol. 105).

\* cited by examiner

PRODUCT PLACEMENT OPTIMIZATION USING BLIND-SPOT ANALYSIS IN RETAIL ENVIRONMENTS

FIELD

The present invention relates to determining an optimum product placement in a point-of-sale retail environment using customer blind spot analysis.

BACKGROUND

Systems and methods are known for performing eye gaze tracking. For example, various virtual reality (VR) systems have been proposed that replicate the experience of a customer physically browsing a retail store. These VR systems examine the customer's eye gazes while the customer is engaged in the process of browsing.

SUMMARY

The following summary is merely intended to be exemplary. The summary is not intended to limit the scope of the claims.

According to an aspect, a system translates mass eye gaze of retail store customers into financial profitability via product placement optimization, and iteratively runs a method to optimize product placements, and generate gaze-based heat maps and perform blind spot analysis for avoiding product placements at certain locations and placing products at other locations.

According to one aspect, there is provided a method of managing resources in a retail environment. The method comprises: obtaining, by a processor, gaze vector data indicating representing consumer gazes locations and products within retail environment; receiving, at the processor, a zone of interest at the retail environment; determining, by the processor, a gaze fixation based on an intersection of a gaze vector with the zone of interest; creating, by the processor, one or more gaze fixation features based on the gaze fixation; and creating and storing a data object including an identifier of the product within the retail environment, a location within the retail environment, and one or more fixation features; iteratively using the processor to repeat, over a period of time, the obtaining gaze vector data, the receiving zone of interest, determining the gaze fixation, the creating of one or more gaze fixation features, and the creating of data objects; generating, by the processor, using the generated data objects, as a result of the iterating, a product placement map indicating mapping of a product to a specific location in the retail environment; and outputting, by the processor, via a display device, a recommended location within the retail environment for placing a product.

Other embodiments include a computer program product and a system.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

According to an embodiment, the present disclosure provides for a system and a method for optimizing a product placement in a retail store by observing mass eye gaze behavior of customers in the retail store over a period and translating the eye gaze details of the customers into a financial profitability optimization model.

Figure 1:
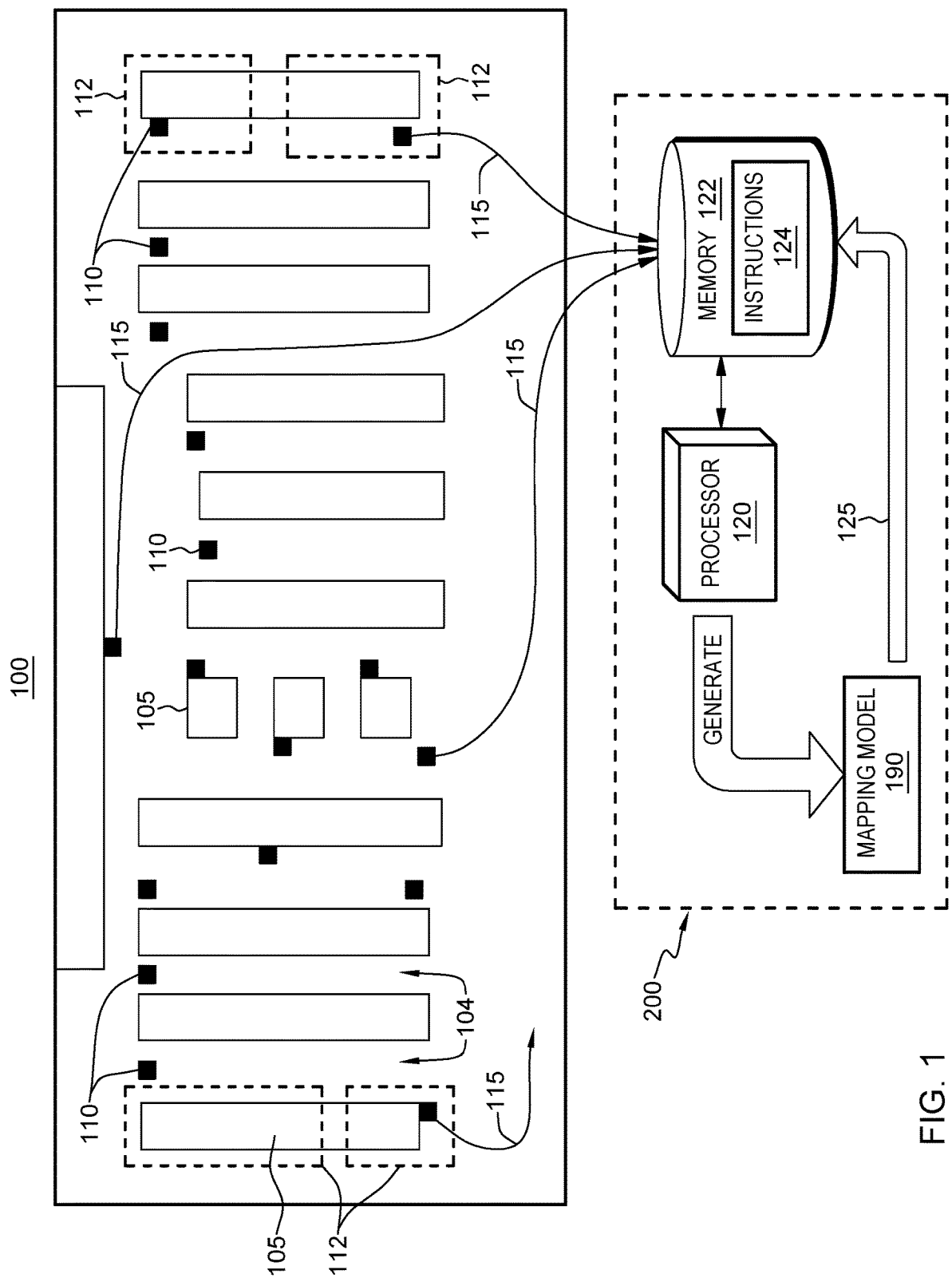
FIG. 1 conceptually illustrates an exemplary retail store environment and computer system for determining an optimum product placement in a point-of-sale retail environment using customer blind spot analysis accordance with one or more embodiments of the present invention.

FIG. 1 conceptually a top plan view of an example retail environment or store 100 provisioned with rows or isles 104 of products. At each aisle 104, there is series of shelving or product racks 105 including shelving that house retail goods and products for customer purchase. Additionally shown at a rack 105 are one or more zones (e.g., pre-defined bounding boxes) 112 associated with products/product type. As shown in the top down view of the example retail store, at each aisle, at each rack/shelf and zone, there is located one or more eye gaze tracking devices or modules 110 along aisle equipment each eye gaze tracking device implementing known eye/vision tracking technology. In one embodiment, eye gaze tracking devices 110 can include a standard monocular/camera setup, webcam or a specialized infrared eye tracker device to obtain customer gaze vectors in the mass retail setting. Each eye tracker device is programmed at a resolution that ensures ability to accurately track a customer's gaze when looking at particular products along the shelves of products.

Each eye gaze tracker is focused on tracking what products and/or locations each customer is focusing on in the retail store. Each eye gaze tracker device 110 provides customers' eye gaze tracking signals 115 that are captured at a computing device 200 implementing gaze-tracking algorithms to provide eye gaze estimation based on a mass eye gaze fixation behavior of customers. The computing device 200 implements a system and associated methods to translate the mass eye gaze behavior (i.e., fixations) of retail store customers, observed over a period of time, into a financial profitability optimization model. In an embodiment, the eye gaze estimation processing is used to generate eye gaze vectors used in generating the model. The system implementing computing device 200 generates the financial profitability optimization model based on 1) the mass user gaze fixation behavior with respect to the products; 2) the mass user gaze fixation behavior with respect to product racks (irrespective of products); and 3) the financial profitability of each product/product type.

FIG. 1 further illustrates generally an example computer system, in one embodiment, that can be utilized to optimize product placement based on customer mass eye gaze fixation, arranged in accordance with at least some embodiments described herein. In some examples, the system 200 may be implemented with a processor 120 and a memory 122 configured to be in communication with each other. In some examples, the processor 120 may be a central processing unit of a computer device, and may be configured to control operations of the memory 122 and/or other components of the computer device. In some examples, the system 100 may include additional hardware components, such as programmable logic devices, microcontrollers, memory devices, and/or other hardware components, that may be configured to perform respective tasks of the methods described in the present disclosure. In some examples, the processor 120 may be configured to execute software modules that include instructions to perform each respective task of the methods described in the present disclosure.

The memory 122 is configured to selectively store instructions executable by the processor 120. For example, in one embodiment, the memory 122 may store a set of instructions 124, where the instructions 124 include instructions, such as executable code, related to eye gaze estimation algorithms and/or other techniques for maximizing an optimization (profitability) function and generating an optimized placement mapping, implemented in the system 200. The memory 122 additionally stores product placement maps and financial data pertaining to the products offered for sale at the retail store 100 that can be used to calculate a profitability of a product.

In this embodiment, the system 200 uses product placement maps at the retail store and implements methods to extract the financial operation points (e.g., cost price, sell price, minimum and maximum permissible prices of sale, etc.) from a retail store catalog/database. In an embodiment, the system performs an iterative refinement of product placements over a period of time of the product or similar products (e.g., similar category), and produces a model for advising product placement to the retail store, such that their financial profitability is optimized. In a further embodiment, the system provides for the transforming the mass of eye gaze points into a heatmap and blind spot finder, in order to maximize the financial profits of a store, by exploiting the intricacies of eye gaze behavior.

Referring back to FIG. 1, the processor 120 is configured to execute one or more portions of the instructions 124 in order to facilitate implementation of the system 100 for the transforming the mass of eye gaze points into a heatmap and blind spot finder in order to maximize the financial profits of a store. For example, to be described in more detail below, the processor 120 is configured to execute the instructions 124 to generate a mapping model 190 for use by the processor in outputting mapping recommendations 125 to locate products at the retail store to specific rack, zone, shelf and coordinate locations within the retail store zone of an entity 100 in a manner that maximizes the store's profitability. In some examples, the instructions 124 may be packaged as a standalone application that may be installed on the computer device implementing the system 100, such that the instructions 124 may be executed by the processor 120 to implement the system 100. In some examples, the instructions 124 may be stored in a programmable hardware component that may be embedded as part of the processor 120.

Figure 2A:
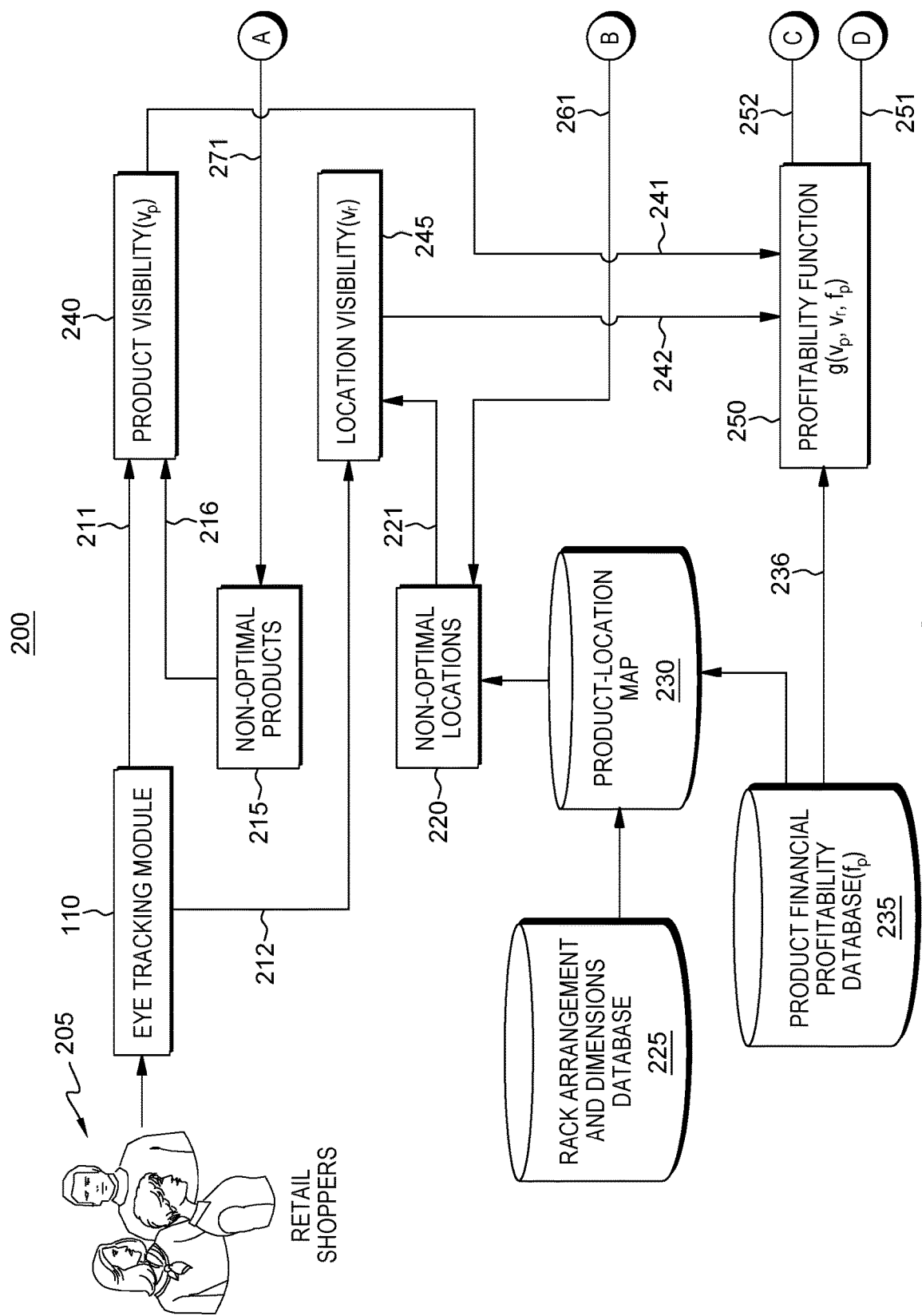
FIGS. 2A and 2B illustrate a detailed exemplary system for determining an optimum product placement in a point-of-sale retail environment using customer blind spot analysis accordance with one or more embodiments of the present invention.
Figure 2B:
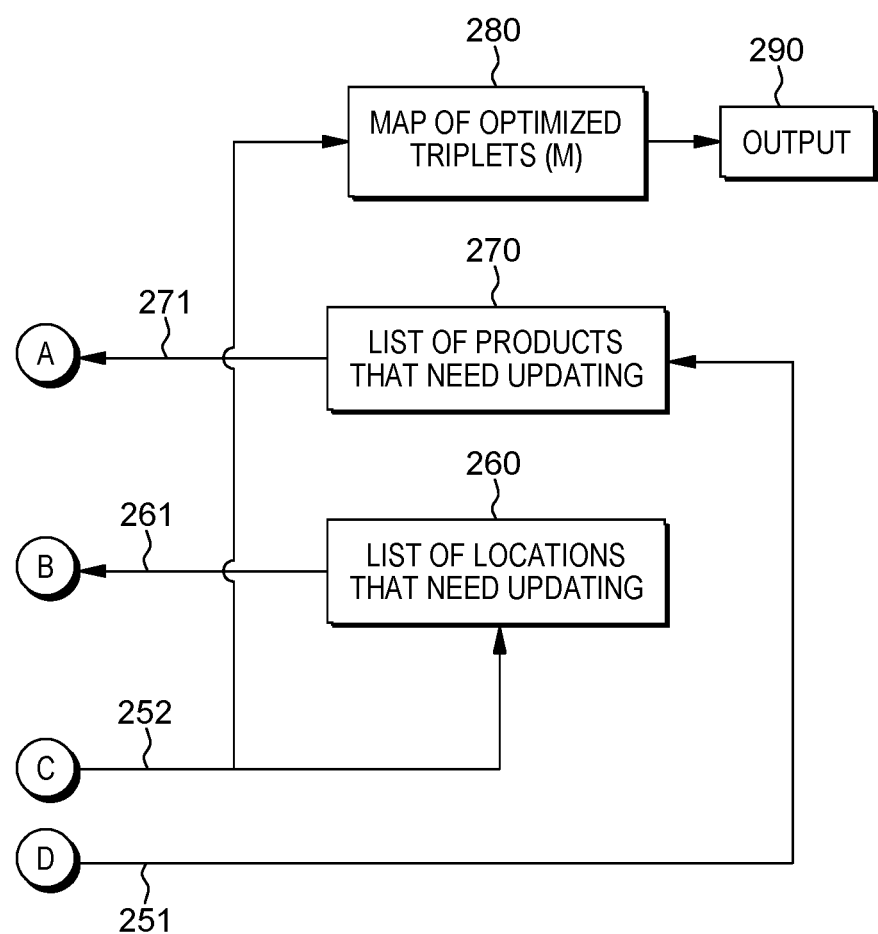

FIGS. 2A-2B illustrate in greater detail a computer-implemented system 200 for generating and refining the product placement model for use at a retail establishment. As shown, eye gaze sensors in the eye track modules 110 generate eye gaze fixation data relating to the gazes of customers 205 at the various locations including rack, shelf coordinate locations and the amount of time of each customer's gaze.

The customers' eye gaze fixation data 211 is used to generate eye gaze data vectors representing locations of visibility of the products themselves, i.e., representing the mass user gaze fixation behavior with respect to products including the product p and the amount of time customers actually fixate their view (or not) specific product p in the retail environment. FIG. 2A shows the system 200 generating product visibility values ($v_p$) 240 for use in generating the product placement model. In an embodiment, a product visibility value ($v_p$) may be a value ranging anywhere between 0 and 1 for example, with the best measure of product visibility being a value of 1 based on the obtained customer gaze fixation features.

Further, the customers' eye gaze fixation data 212 is used to generate eye gaze vectors representing locations of visibility within the retail environment i.e., representing the mass user gaze fixation behavior with respect to product racks (irrespective of products) including locations and the amount of time customers actually fixate their view (or not) when in the retail environment without consideration of products. FIG. 2A shows the system 200 generating location visibility values ($v_r$) 245 for use in generating the product placement model. In an embodiment, a location visibility value ($v_r$) may be a value ranging anywhere between 0 and 1 for example, with the best measure of location visibility being a value of 1 based on the obtained customer gaze fixation features.

Additionally shown in FIG. 2A are one or more databases including: 1) a database 225 for storing accumulated rack arrangement and dimensions data of the structures within the retail environment upon which products are placed. This database maintains current data representing the physical organization and arrangement of racks at the retail environment including rack and shelf space dimensions and physical coordinates; 2). a database 230 for storing current products and their locations within the rack and shelving. In an embodiment, this data includes a mapping of products to locations, e.g., the physical coordinates (a product-locations map); and 3) database 235 for storing current products and their corresponding financial profitability represented as a profitability value ($f_p$) of each product/product type p. In an embodiment, system 200 runs methods to extract, for each product p, the financial operation points including, but not limited to: cost price, sell price, minimum and maximum permissible prices of sale etc.) from a retail store catalog/database used in determining the financial profitability value $f_p$.

In an embodiment, based on the generated customer product visibility values ($v_p$) 241 and location visibility values ($v_r$) 246 and given the financial profitability value $f_p$ 236 of the respective product, the system 200 optimizes (e.g., computes) a profitability function $g(v_p, v_r, f_p)$ implemented as a financial profitability optimization model 250 for use in generating optimal placements of product p within the retail environment or store.

In an embodiment, g( ) is a computation of the profitability of a product/product type at a given rack "r". For example, g( ) can be a simple multiplication of all three quantities. For example, for a product p given that $v_p=1$ and fp=1, for a rack r,$v_{r=1}$, then, if g is a multiplication of all three quantities then g=1. Given another product "q", it has $v_q=0.8$ and $f_q=1$. Then for the same rack r, this product will have g( )=0.8. This means the profitability of placing the product p is higher than product q at rack r.

As shown in FIGS. 2A and 2B, based on the profitability function g($v_p$, $v_r$, $f_p$) and associated $v_p$, $v_r$, $f_p$ values data 251 the system generates at 270 a list of products that still need updating (need corresponding mass gaze fixation data). Further, based on the optimized profitability function g($v_p$, $v_r$, $f_p$) and associated $v_p$, $v_r$, $f_p$ values data 252 there is generated at 260 a list of locations that need updating. To determine these location that need updating, in an embodiment, g( ) is computed periodically for every location/zone/rack. If a location has higher go for another product compared to the product currently placed, then that location needs updating.

Additionally, based on the profitability function g($v_p$, $v_r$, $f_p$) and associated $v_p$, $v_r$, $f_p$ value data 252, there is generated at 280 a mapping (M) of optimized triplets to locations, the triplet M referring to data including location, product and product profitability.

As shown in FIGS. 2A and 2B, the determined list of products that still need updating 271 are determined, and additionally, from this list, computer system 200 determines any non-optimal products 215, i.e., a "heatmap" of products whose profits are not maximized and/or currently lack sufficient visibility. For example, the heatmap can be generated to show at different locations, what can be the potential value of g( ) as compared to what is the current go for non-optimal products. For these non-optimal products 216, the system iteratively records the customers' gaze over a period of time for use in generating/refining and updating the associated product visibility values $v_p$ 241.

Further, the list of locations that still need updating 261 are determined, and additionally, from this list, computer system 200 determines any non-optimal locations 220, i.e., "blind-spot" locations within the retail environment that lack any measure of visibility to customers. That is, the blind-spot locations can be determined by using Vr over a period. If a location not receiving enough attention, or whose Vr<some threshold, then the location is a blind spot. For these non-optimal product locations 221, the system iteratively records the customers' gaze over a period of time for use in generating/refining and updating the associated location visibility value $v_r$ 242.

As shown in FIGS. 2A and 2B, system 200 invokes iterative methods to iteratively refine product placements, i.e., placements of the product p or similar products (e.g., similar category), over a period of time, and generate a placement position model 290. Over time, the system 200 iteratively determines/updates location visibility values $v_r$, product visibility values $v_r$ and corresponding product financial profitability value data $f_p$ and correspondingly invokes processes to ensure a maximum profitability function g($v_p$, $v_r$, $f_p$). Based on the updated maximized profitability function, the system updates the corresponding updated map of optimized triplets $v_p$, $v_r$, $f_p$ defining triplets (M) (rack/location, product and product's financial profitability). Based on this updated map of optimized M, system 200 updates the model 290 for advising product placement to the retail store, such that their financial profitability is optimized. The transforming of the mass of eye gaze points into a heatmap and "blind spot" finder, to maximize the financial profits of a store, enables increased financial profitability of a store by better utilizing the "premium gaze spots" to place more profitable products or more attractive products. Model 290 specifies a placement position at a rack, zone and shelf for each product/product type, such that the probability of maximum financial profitability of the retail store is maximized.

Figure 3:
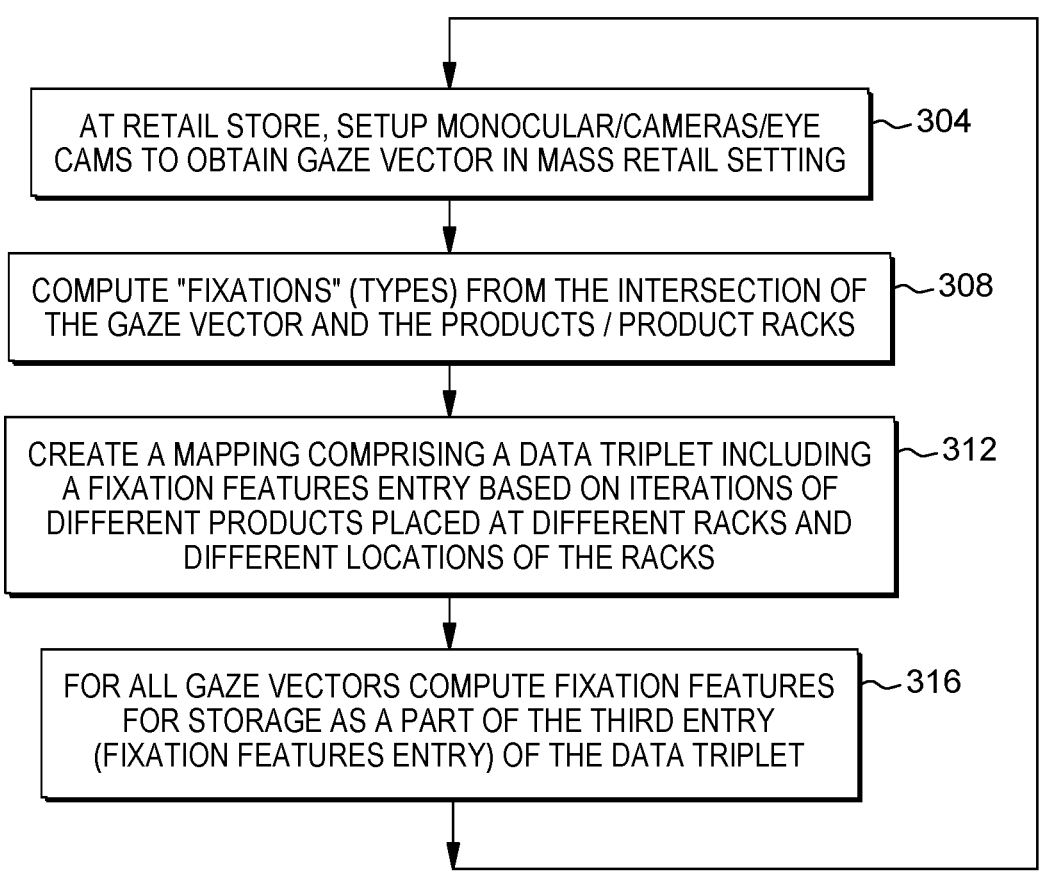
FIG. 3 illustrates an exemplary iterative method run to obtain the customer's mass gaze fixation data/vectors for use in determining optimal product placement maps.

FIG. 3 illustrates an exemplary iterative method 300 run to obtain the customer's mass gaze fixation data/vectors for use in determining optimal product placement maps. First, as shown in FIG. 1, the eye gaze vector data is retrieved from the eye gaze tracking devices 110. For example, at 304, monocular/camera setups are used to obtain gaze vectors data in the mass retail setting which data may be stored for use as input to the system. In an embodiment, at 304 eye gaze fixations are monitored for all plurality of customers patronizing the retail environment (store) to generate the gaze vectors. Next, at block 308 the system computes "fixations" (types) based on an intersection of the gaze vectors and the products/product racks. Particularly, system 200 generates three types of fixations from the intersection of the gaze vector and the products/product racks (objects of interest): 1) a fixation towards specific products/product types, given an input pre-arrangement of the products. That is, methods are run to identify the products/product types of interest. This may include accessing and inputting the product-location mapping data from database 230; 2) a fixation towards given zones on each given retail racks; 3) or a fixation towards to each individual (x,y) coordinate on each retail rack which coordinates can later be accumulated and agglomerated to map onto zones/products.

As the process is iterative, continuing at 312, the method creates a mapping including a generated data triplet including one or more fixation feature entries based on iterations of different products placed at different racks and different locations of the racks. That is, as the process is iterative, over iterations of different products placed at different racks and different locations of the racks, the method generates a map including a data triplet as follows:

(product Id, location within the store, <fixation features>).

wherein product Id is the identifier of the product p, location within the store is represented as a two-dimensional (x,y) or three dimensional (x, y, z) coordinate. For all gaze vectors, the system computes the following fixation features, that can be stored as a part of the third entry (fixation features entry) of the above data triplet: Total fixation duration (TFD), Number of fixation durations (NF), Average fixation durations (AFD), Total time tracked (TTT), Total time in target shelf (TVS), Percentage of viewing time (PVT), Total fixation duration on product zones (TFP), Percentage of time spent in product zone (PTZ)=TFP/TVS, Percentage of time spent in product void (PTV)=(TVS−TVP)/TTT, Cluster average of saccade paths (ASP)=Nearest vectors of saccade paths averaged to find set of average (where a saccade path is a quick, simultaneous movement of both eyes between two or more phases of fixation in the same direction).

Figure 4:
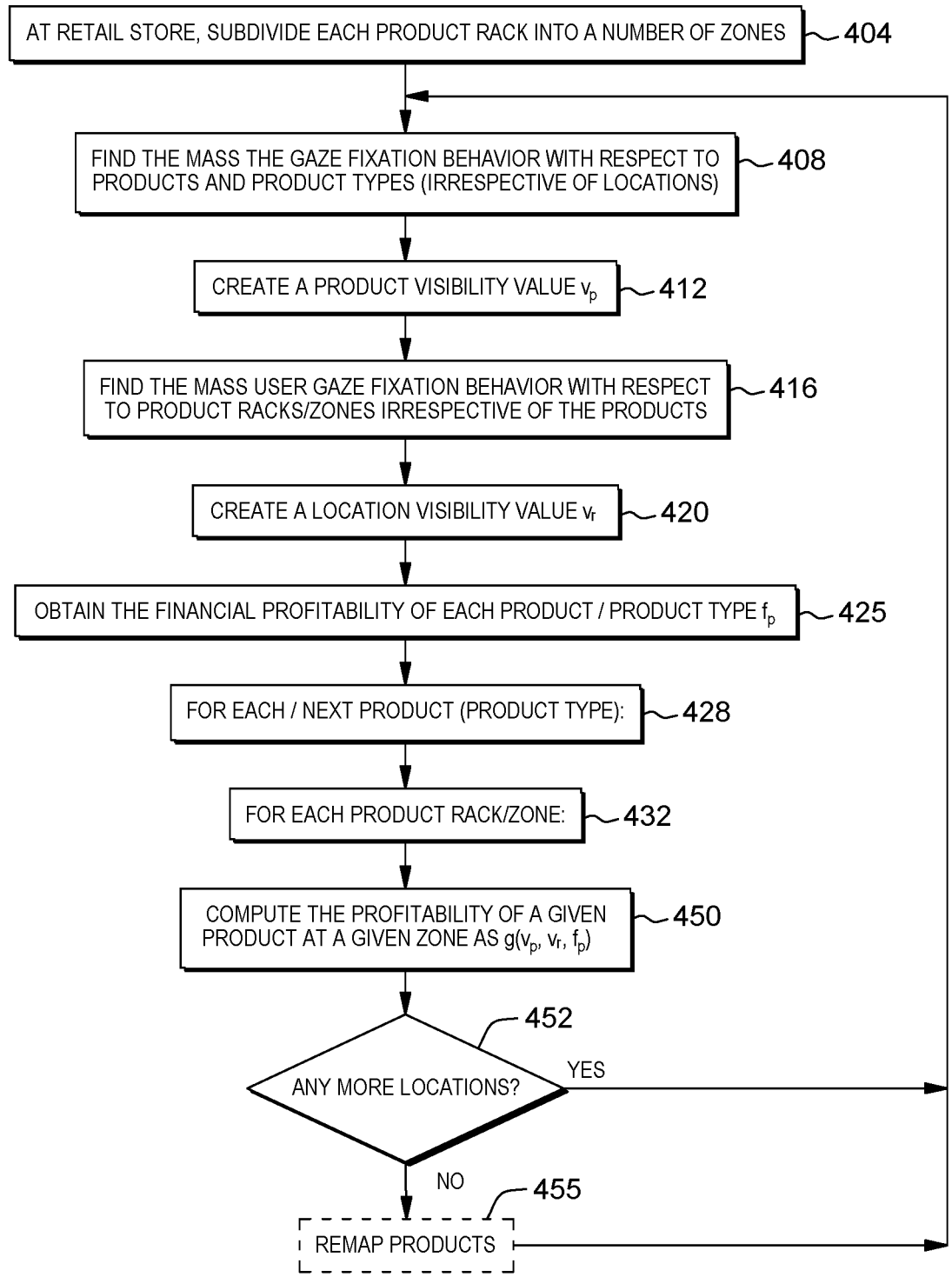
FIG. 4 illustrates an exemplary iterative method run to generate and output the model specifying an optimal placement/position for each product/product type in a point-of-sale retail environment using customer blind spot analysis, such that the probability of maximum financial profitability of the retail store is maximized in accordance with one or more embodiments of the present invention.

FIG. 4 illustrates an exemplary iterative method 400 run to generate and output the model 290 specifying an optimal placement/position for each product/product type in a point-of-sale retail environment using customer blind spot analysis, such that the probability of maximum financial profitability of the retail store is maximized. Such a model is generated based upon the camera/video-camera-based inputs that can be processed using gaze point estimation and/or gaze tracking algorithms, the product rack co-ordinates data, the products/product types (given, or detected via external third-party technologies), and the financial profitability of each product/product type.

In method 400 for determining an optimum product placement in using customer blind spot analysis in accordance with one or more embodiments of the present invention, a first step 404 includes subdividing each product rack into a number of zones. The subdividing can invoke processes defining or generating location boundaries according to a defined physical location coordinate system (x, y, z). In an embodiment, the zones might have policy-based "hard" boundaries, or "softer" boundaries determined by external factors). Then, at 408, the method includes finding the mass gaze fixation behavior with respect to products p and product types, irrespective of the locations, and creating a product visibility value $v_p$ for each product p at 412. In an embodiment, the products/product types can be initially arranged randomly or at predetermined initial locations. Continuing at 416, the method includes finding the mass user gaze fixation behavior with respect to product racks/zones, irrespective of the products, and the creating of the visibility value $v_r$ at 420. At 425, the method obtains the financial profitability $f_p$ of each product/product type. Then, for each product (or product type) 428, for each product placed at a location or zone and rack 432, the method implements processes at 450 for finding the profitability of a given product at the given zone according to the optimization model $g(v_p, v_r, f_p)$.

As time evolves, a periodic re-computation is carried out for each location and the products are re-mapped. Thus, as shown at 452, a decision is made as to whether there are any more locations in the retail environment for which the profitability of a given product at the given zone according to the optimization model $g(v_p, v_r, f_p)$ is to be generated. If there are more locations, the method returns to 408 to obtain the next product and rack/zone in order to repeat steps to compute the product and location visibility values and the profitability of the given product at the given zone. Otherwise, if it is determined at 452 that there are no more locations to process, at 455 the system refines the recommended mapping of the products to locations (racks/zones) prior to returning to step 408 to repeat these steps as new products and product locations are introduced at the retail environment.

Figure 5A:
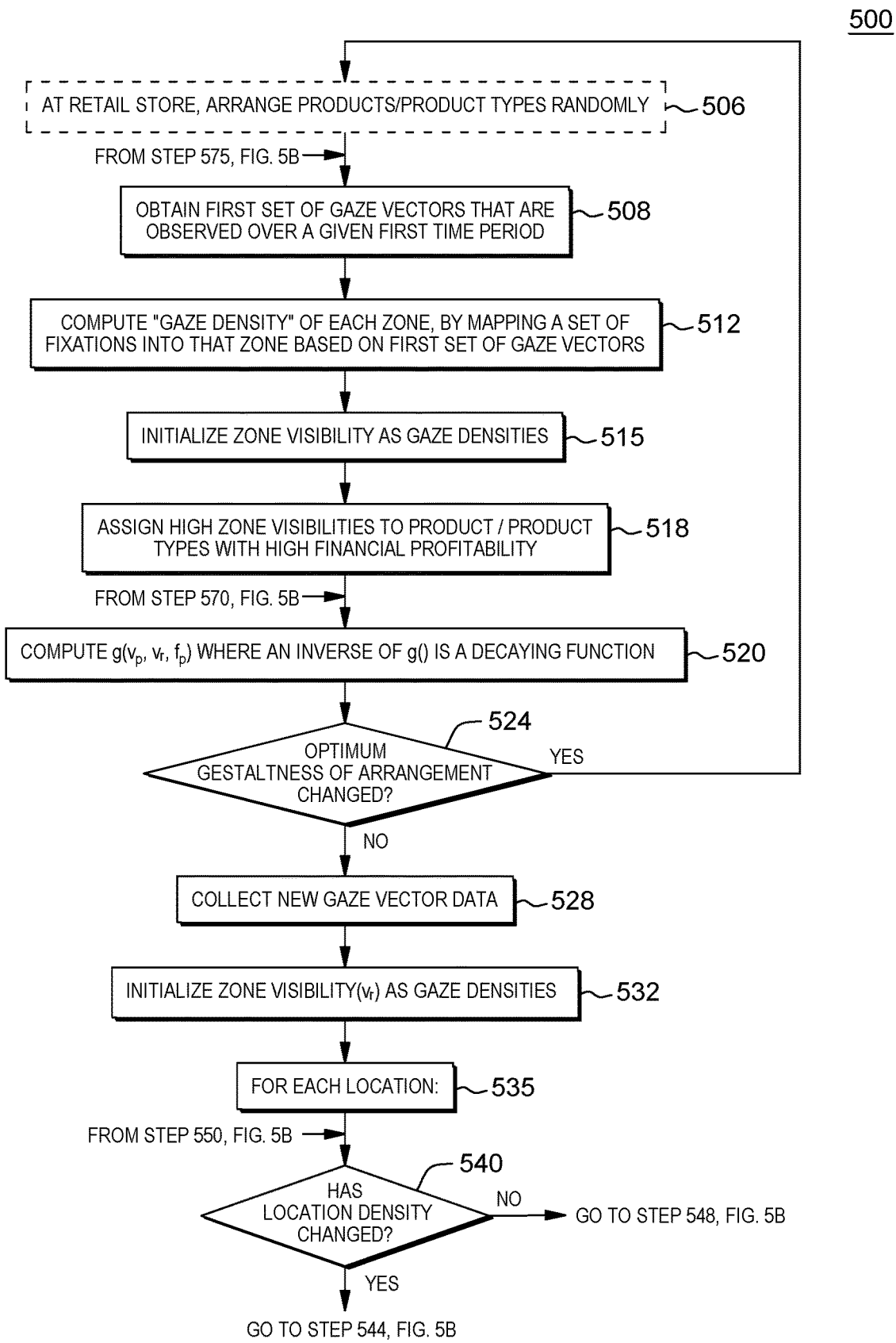
FIGS. 5A-5B depict an embodiment of a method for mapping fixation and financial profitability into optimum gestalt arrangements in accordance with one or more embodiments of the present invention.
Figure 5B:
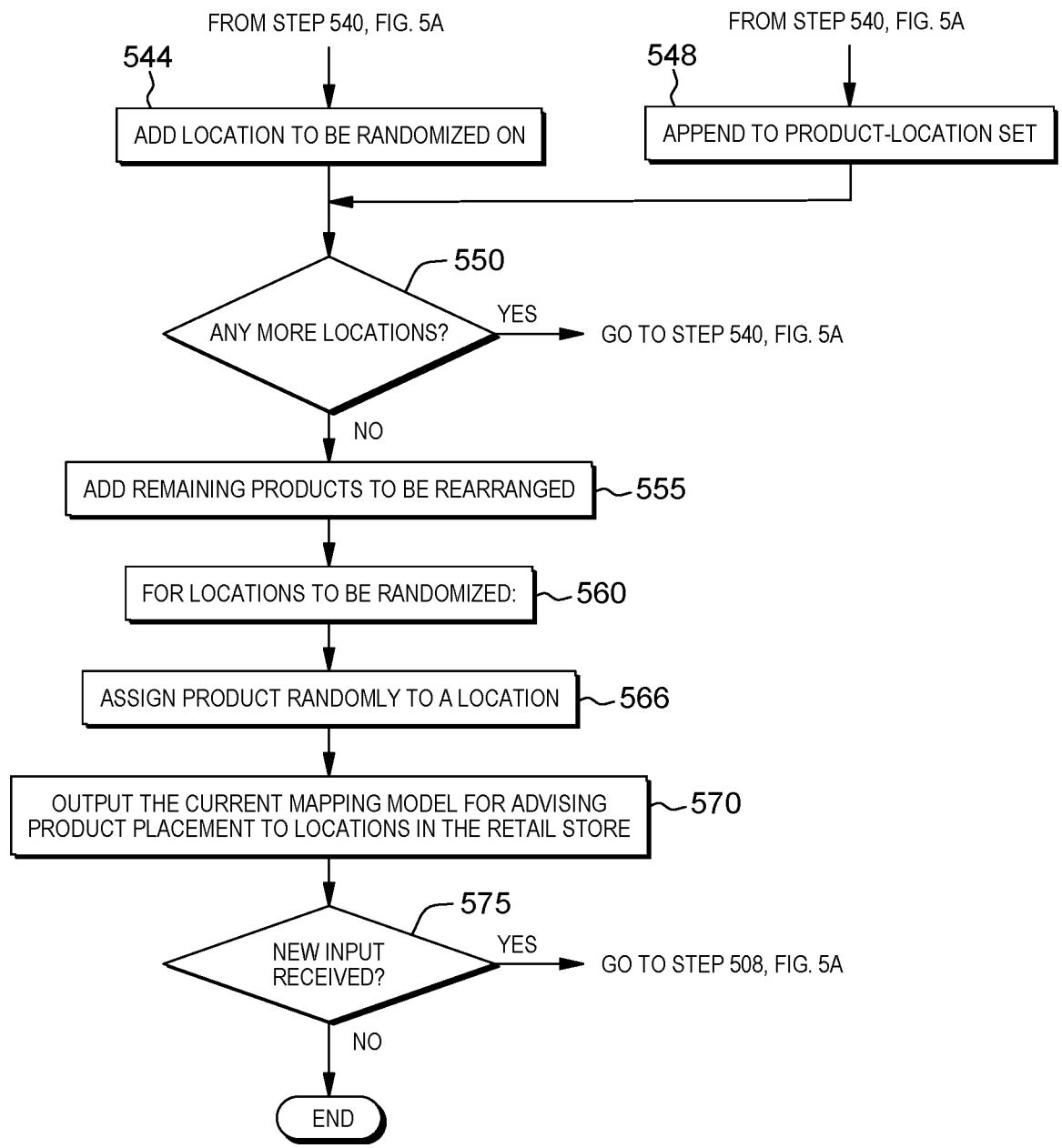

FIGS. 5A-5B depict one illustrative embodiment of an iterative method 500 of computing using profitability function $g(v_p, v_r, f_p)$, a profitability of a given product, when placed at a given zone/location of a rack. In particular, FIGS. 5A-5B depict an embodiment of a method 500 for mapping fixation and financial profitability into optimum gestalt arrangements. As shown in FIG. 5, a first step 506 involves providing an initial arrangement of products/product types. In an embodiment, the initial arrangement of products at racks/zones/locations is random. Then at 508, system 100 obtains a first set of gaze vectors observed over a given first period of time (e.g., as few days). Then, at 512, system 100 uses the first set of gaze vectors that are observed over a given first period to compute "gaze density" of each zone, e.g., by mapping a set of fixations into that zone. Continuing at 515, system 100 then initializes zone visibility as gaze densities and at 518, assigns high zone visibilities to product/product types with high financial profitability. Then, at 520, the system computes the corresponding $g(v_p, v_r, f_p)$ function. In an embodiment, the inverse of g( ) is a decaying function.

Next steps 524-540 depicts steps to be repeatedly performed while a "gestaltness" of arrangement (products-locations) has not changed (using $g(v_p, v_r, f_p)$ to average). That is, if a product location mapping does not change in a store, then the average of g( ) is taken as a location, product and product profitability for that period. That is, at 524, upon determining that an optimum "gestaltness" of arrangement has changed, the process of FIGS. 5A, 5B will re-start by returning to step 506. That is, when based on g( ) for all the locations and all the products, if the system finds the current arrangement is not optimum, it suggests changes in the arrangement. Otherwise, at 524, if it is determined that an optimum "gestaltness" of arrangement has not changed, the process proceeds to iteratively repeat the following steps including: collecting of new gaze data at 528, and at 532, initializing zone visibility ($v_r$) as gaze densities (e.g., for the first run and then return). Then at 535 there is performed an iterative process beginning at 535, for each location, and at 540, a determining of whether the location density (at that location) has changed. If it is determined at 540 that the location density (at that location) has changed, then the process proceeds to 544, FIG. 5B for adding this location as a location to be randomized on. Otherwise, at 540, if it is determined that the location density (at that location) has not changed, then the process proceeds to 548, FIG. 5B where the location for that product is appended to a product-location set which is stored in product-location map database 230.

After either adding a current location to be randomized at 544, or alternatively appending the location to a product-location at 548, the process continues at 550, FIG. 5B, where a determination is made as to whether there are any more locations to be processed. If there are more locations to process, then the method returns to step 540, FIG. 5A for determining, for the next location, whether the location density has changed, in which case the process returns to either steps 544, 548 and repeats at step 550 until no more locations are to be processed. That is, at 550, if it is determined that there is no more locations, the process proceeds to step 555, FIG. 5B where the method adds or records to a list the remaining products to be rearranged. Then, at 560, for the locations determined at 544 to be randomized on, the process proceeds to 566 in order to assign a product randomly to a location, i.e., mapping is the assignment of a product to a location randomly.

Then, continuing at 570, based upon the computed product-location mapping, the method generates and outputs the current model 290 from which data can be displayed on an GUI display advising a mapping of the product placements to locations (racks/shelves/zones) within the retail store. In an embodiment, the portion of the method in the embodiment depicted in FIGS. 5A, 5B, performs a randomizing over sub portions of a rack to enable control of $v_p$ and $v_r$ iteratively to superimpose $f_p$ and thus avoiding any stray randomness.

The method of FIGS. 5A and 5B are iterative to the extent that a determination is made at 575 as to whether new input has been received, e.g., whether new input data regarding introduction of a new product p or removal of a product p, or a wholesale change in location of a product within the retail store has been received. If it is determined that new input has been received, then the process proceeds back to step 508, FIG. 5A in order to receive new gaze vector input data and iterate the computation based on new inputs over a period of time.

Figure 6:
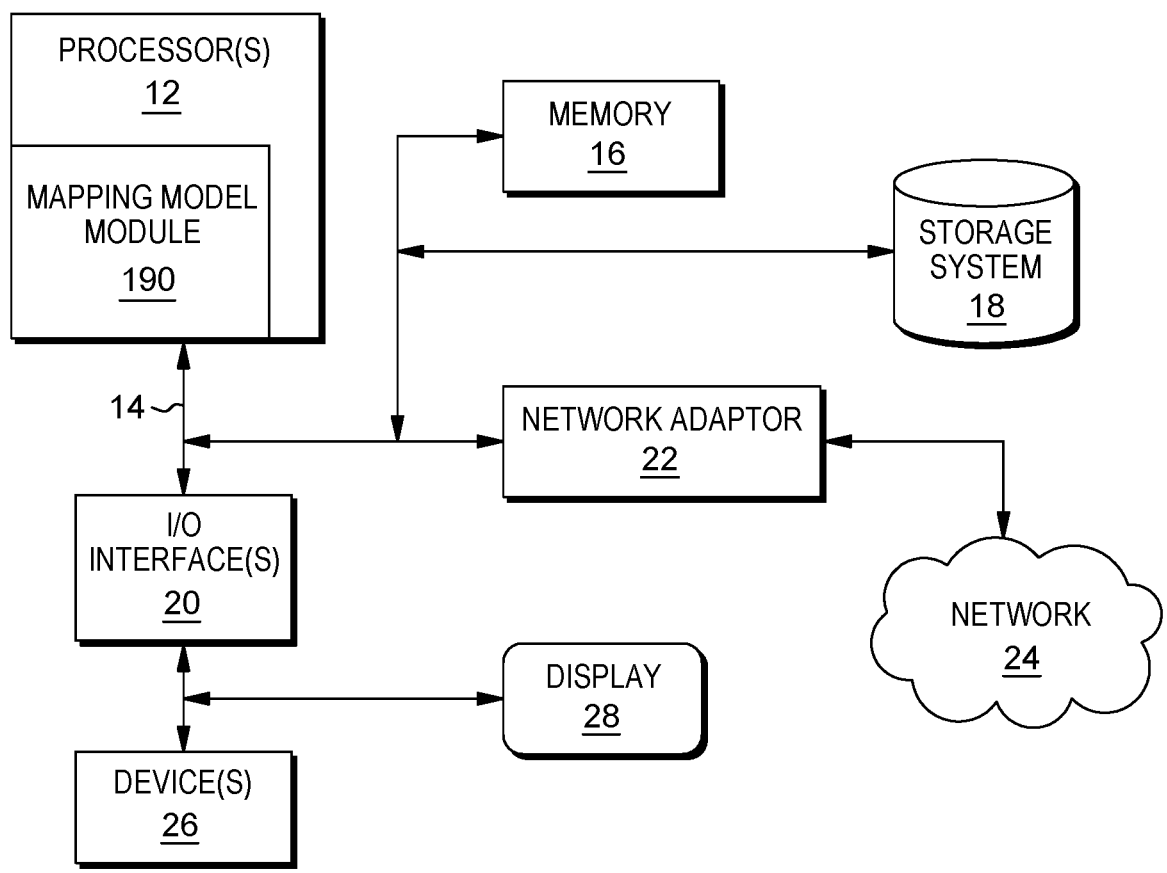
FIG. 6 illustrates a schematic of an example computer or processing system that may implement methods for optimizing a product placement in a retail store in one embodiment.

FIG. 6 illustrates a schematic of an example computer or processing system that may implement identifying an optimum placement for a product based on a mapping of products to specific rack/zone/shelf display locations based upon a financial profitability level of the product when placed at that location in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system 200 shown in FIGS. 1 and 2A, 2B may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., product-location mapping module 190) that performs the methods described herein. The module 190 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of managing resources in a retail environment, the method comprising:
    obtaining, via plurality of eye tracker devices located in a retail environment, eye gaze fixation data of a plurality of customers gazing at products initially placed at rack or shelf locations in the retail environment;
    generating, by a processor, from said eye gaze fixation data of a plurality of customers, gaze vector data representing mass eye gaze fixation behavior of the plurality of customers gazing at products, irrespective of locations of the products, within the retail environment observed over a given period of time;
    determining, by the processor, a product visibility value to each product based on the gaze vector data;
    receiving, at the processor, one or more zones of interest at the retail environment;

determining, by the processor, for each zone of interest, a gaze fixation based on an intersection of a gaze vector with the zone of interest and obtaining a gaze density for each said zone of interest;

determining, by the processor, a location visibility value to each zone based on a gaze density obtained for each zone;

obtaining, by the processor, a profitability measure of a product when placed at a specific location of a current arrangement of products within the retail environment;

computing, by the processor, for each product, a map placement value as a function of said profitability measure, said location visibility value of the product's location and the product's visibility value;

generating, using the computed map placement values, a list of non-optimal rack or shelf locations at which a currently placed product can be replaced by another product to improve its map placement value, and generating a list of non-optimal products that currently need eye gaze fixation data to increase a corresponding location visibility value or profitability measure;

generating, by the processor, from the list of non-optimal rack or shelf locations and non-optimal products and the computed map placement values, a product placement heat map used for mapping other products to locations within the retail environment that improve their corresponding map placement values;

replacing, in response to said rack or shelf locations indicated in said heat-map, currently placed non-optimal products at those said rack or shelf locations with other products that improve their corresponding map placement values;

and iteratively refining product placements at one or more locations over a period of time by: responsive to existence of remaining said non-optimal products and non-optimal rack or shelf locations, controlling said plurality of eye tracker devices to obtain additional mass eye gaze fixation behavior data of a plurality of customers for the current arrangement of products within the retail environment, an updating of corresponding map placement values for said non- optimal products, an updating of said heat map using said map placement values to indicate non- optimal product placement locations that improve their corresponding map placement values, and the replacing, in response to said locations indicated in said updated heat-map, currently placed non-optimal products at those said locations with other products, said iterative refining repeated until a placement of all products in the retail environment is optimized.

2. The computer-implemented method of claim 1, further comprising: creating, by the processor, one or more gaze fixation features based on the mass eye gaze fixation behavior, wherein the gaze fixation features comprise one or more of the group selected from: a total time in target shelf; a percentage of viewing time; a total gaze fixation duration in the zone of interest; a percentage of time spent in a zone of interest.

3. The computer-implemented method of claim 2, said method further comprising: computing the one or more fixation features based on one or more of: a total gaze fixation duration; a number of gaze fixations; an average gaze fixation duration time; a total time a gaze fixation is tracked; a percentage of time a gaze fixation is in a product void; and a clustered average of eye gaze saccade paths.

4. The computer-implemented method of claim 3, further comprising: computing, by the processor, the product visibility value for a product of interest based on said gaze fixation features.

5. The computer-implemented method of claim 3, wherein the zone of interest is a location of interest within the retail environment, said location of interest comprising one or more of: a zone in a rack, a shelf on the rack, a predefined bounding box for a target shelf; and an (x, y, z) coordinate for a target retail shelf, said method further comprising: computing, by the processor, the location visibility value for said product of interest based on said gaze fixation features.

6. The computer-implemented method of claim 5, wherein said generated product placement heat map further indicates blind spots corresponding to locations of limited or no visibility in the retail environment.

7. The computer-implemented method of claim 1, wherein said updating of said heat map using said map placement values to indicate non-optimal product placement locations that improve their corresponding map placement values comprises: receiving the zone of interest, the determining the gaze fixation for a refined arrangement of products within the retail environment, and for products and locations within the refined arrangement, repeat the determining of each product's visibility value, a zone's location visibility value where the product is newly located, and the product's profitability measure at the revised location to update the product placement map function.

8. A computer program product, the computer program product comprising a computer-readable storage medium having a computer-readable program stored therein, wherein the computer-readable program, when executed on a computer including at least one processor, causes the at least one processor to:

obtain, via plurality of eye tracker devices located in a retail environment, eye gaze data of a plurality of customers gazing at products initially placed at rack or shelf locations in the retail environment;

generate, from said eye gaze data of a plurality of customers, gaze vector data representing mass eye gaze fixation behavior of the plurality of customers gazing at products, irrespective of locations of the products within the retail environment observed over a given period of time;

receive one or more zones of interest at the retail environment;

determine, for each zone of interest, a gaze fixation based on an intersection of a gaze vector with the zone of interest and obtaining a gaze density for each said zone of interest;

obtain a profitability measure of a product placed at a specific location of a current arrangement of products within the retail environment;

compute, for each product, a map placement value as a function of said profitability measure, said location visibility value of the product's location and the product's visibility value;

generate, using the computed map placement values, a list of non-optimal rack or shelf locations at which a currently placed product can be replaced by another product to improve its map placement value, and generating a list of non-optimal products that currently need eye gaze fixation data to increase a corresponding location visibility value or profitability measure;

generate from the list of non-optimal rack or shelf locations and non-optimal products and the computed map placement values a product placement heat map used for mapping other products to locations within the retail environment that improve their corresponding map placement values;

replace, in response to said rack or shelf locations indicated in said heat-map, currently placed non-optimal products at those said rack or shelf locations with other products that improve their corresponding map placement values;

and iteratively refine product placements at one or more locations within the retail environment over a period of time by: responsive to existence of remaining said non-optimal products and non-optimal rack or shelf locations, controlling said plurality of eye tracker devices to obtain additional mass eye gaze fixation behavior data of a plurality of customers or the current arrangement of products within the retail environment, an updating of corresponding map placement values for said non-optimal products, an updating of said heat map using said map placement values to indicate non-optimal product placement locations that improve their corresponding map placement values, and the replacing, in response to said locations indicated in said updated heat-map, currently placed non-optimal products at those said locations with other products, said iterative refining repeated until a placement of all products in the retail environment is optimized.

9. The computer program product of claim 8 wherein the at least one processor is further caused to: create one or more gaze fixation features based on the mass eye gaze fixation behavior, and compute the one or more fixation features based on one or more of: a total gaze fixation duration; a number of gaze fixations; an average gaze fixation duration time; a total time a gaze fixation is tracked; a percentage of time a gaze fixation is in a product void; and a clustered average of eye gaze saccade paths.

10. The computer program product of claim 9, wherein the at least one processor is further caused to: compute the product visibility value for a product of interest based on said gaze fixation features.

11. The computer program product of claim 10, wherein the zone of interest is a location of interest within the retail environment, said location of interest comprising one or more of: a zone in a rack, a shelf on the rack, a predefined bounding box for a target shelf; and an (x, y, z) coordinate for a target retail shelf, said at least one processor is further caused to: compute the location visibility value for said location of interest based on said gaze fixation features.

12. The computer program product of claim 11, wherein said generated product placement heat map further indicates blind spots corresponding to locations of limited or no visibility in the retail environment.

13. The computer program product of claim 8, wherein the updating said heat map using said map placement values to indicate non-optimal product placement locations that improve their corresponding map placement values further comprises: the receiving the zone of interest, the determining the gaze fixation for a refined arrangement of products within the retail environment, and for products and locations within the refined arrangement, repeat the determining of each product's visibility value, a zone's location visibility value where the product is newly located, and the product's profitability measure at the revised location to update the product placement map function.

14. A computer-implemented system for managing resources in a retail environment, the system comprising: a memory storage device for storing a computer-readable program, and at least one processor adapted to run said computer-readable program to configure the at least one processor to:

obtain, via plurality of eye tracker devices located in a retail environment, eye gaze data of a plurality of customers gazing at products initially placed at rack or shelf locations in the retail environment;

generate, from said eye gaze data of a plurality of customers, gaze vector data representing mass eye gaze fixation behavior of the plurality of customers gazing at products, irrespective of locations of the products within the retail environment;

receive one or more zones of interest at the retail environment;

determine, for each zone of interest, a gaze fixation based on an intersection of a gaze vector with the zone of interest and obtaining a gaze density for each said zone of interest; obtain a profitability measure of a product placed at a specific location of a current arrangement of products within the retail environment;

compute, for each product, a map placement value as a function of said profitability measure, said location visibility value of the product's location and the product's visibility value;

generating, using the computed map placement values, a list of non-optimal rack or shelf locations at which a currently placed product can be replaced by another product to improve its map placement value, and generating a list of non-optimal products that currently need eye gaze fixation data to increase a corresponding location visibility value or profitability measure;

generate from the list of non-optimal rack or shelf locations and non-optimal products and the computed map placement values a product placement heat map used for mapping other products to locations within the retail environment that improve their corresponding map placement values;

replace, in response to said rack or shelf locations indicated in said heat-map, currently placed non-optimal products at those said rack or shelf locations with other products that improve their corresponding map placement values;

and iteratively refine product placements at one or more locations within the retail environment over a period of time by: responsive to existence of remaining said non-optimal products and non-optimal rack or shelf locations, controlling said plurality of eye tracker devices to obtain additional mass eye gaze fixation behavior data of a plurality of customers or the current arrangement of products within the retail environment, an updating of corresponding map placement values for said non-optimal products, an updating of said heat map using said map placement values to indicate non-optimal product placement locations that improve their corresponding map placement values, and the replacing, in response to said locations indicated in said updated heat- map, currently placed non-optimal products at those said locations with other products, said iterative refining repeated until a placement of all products in the retail environment is optimized.

15. The computer-implemented system of claim 14, wherein the at least one processor is further configured to: create one or more gaze fixation features based on the mass eye gaze fixation behavior; compute the product visibility value for a product of interest based on said gaze fixation features; wherein the zone of interest is a location of interest within the retail environment, said location of interest comprising one or more of: a zone in a rack, a shelf on the rack, a predefined bounding box for a target shelf; and an (x, y, z) coordinate for a target retail shelf, said at least one processor is further configured to: compute the location visibility value for said product of interest based on said gaze fixation features.

16. The computer-implemented system of claim 15, wherein said generated product placement heat map comprises heat maps for indicating further indicates blind spots corresponding to locations of limited or no visibility in the retail environment.

17. The computer system of claim 14, wherein to update said heat map using said map placement values to indicate non-optimal product placement locations that improve their corresponding map placement values, the at least one processor further performs: receiving the zone of interest, determining the gaze fixation for a refined arrangement of products within the retail environment, and for products and locations within the refined arrangement, repeat the determining of each product's visibility value, a zone's location visibility value where the product is newly located, and the product's profitability measure at the revised location to update the product placement map function.

* * * * *